United States Patent
Wang et al.

(10) Patent No.: US 11,282,503 B2
(45) Date of Patent: Mar. 22, 2022

(54) VOICE CONVERSION TRAINING METHOD AND SERVER AND COMPUTER READABLE STORAGE MEDIUM

(71) Applicant: UBTECH ROBOTICS CORP LTD, Shenzhen (CN)

(72) Inventors: Ruotong Wang, Shenzhen (CN); Dongyan Huang, Shenzhen (CN); Xian Li, Shenzhen (CN); Jiebin Xie, Shenzhen (CN); Zhichao Tang, Shenzhen (CN); Wan Ding, Shenzhen (CN); Yang Liu, Shenzhen (CN); Bai Li, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 21 days.

(21) Appl. No.: 17/095,751

(22) Filed: Nov. 12, 2020

(65) Prior Publication Data
US 2021/0201890 A1 Jul. 1, 2021

Related U.S. Application Data

(63) Continuation of application No. PCT/CN2019/130639, filed on Dec. 31, 2019.

(51) Int. Cl.
*G10L 15/06* (2013.01)
*G06N 3/08* (2006.01)
(Continued)

(52) U.S. Cl.
CPC .............. *G10L 15/063* (2013.01); *G06N 3/08* (2013.01); *G10L 15/16* (2013.01); *G10L 15/30* (2013.01);
(Continued)

(58) Field of Classification Search
CPC ...... G10L 15/063; G10L 15/16; G10L 21/003
See application file for complete search history.

(56) References Cited

U.S. PATENT DOCUMENTS 10,186,251 B1 * 1/2019 Mohammadi ....... G10L 13/0335
10,249,314 B1 * 4/2019 Aryal ..................... G10L 25/18
(Continued)

FOREIGN PATENT DOCUMENTS

CN 105390141 A 3/2016

OTHER PUBLICATIONS

ISR for PCT/CN2019/130639.
Written opinions of ISA for PCT/CN2019/130639.

*Primary Examiner* — Shaun Roberts

(57) ABSTRACT

The present disclosure discloses a voice conversion training method. The method includes: forming a first training data set including a plurality of training voice data groups; selecting two of the training voice data groups from the first training data set to input into a voice conversion neural network for training; forming a second training data set including the first training data set and a first source speaker voice data group; inputting one of the training voice data groups selected from the first training data set and the first source speaker voice data group into the network for training; forming the third training data set including the second source speaker voice data group and the personalized voice data group that are parallel corpus with respect to each other; and inputting the second source speaker voice data group and the personalized voice data group into the network for training.

20 Claims, 11 Drawing Sheets

(51) Int. Cl.
    *G10L 15/16*     (2006.01)
    *G10L 15/30*     (2013.01)
    *G10L 21/01*     (2013.01)
    *G10L 25/18*     (2013.01)
    *G10L 25/24*     (2013.01)
    *G10L 21/003*     (2013.01)

(52) U.S. Cl.
    CPC ............ *G10L 21/003* (2013.01); *G10L 21/01* (2013.01); *G10L 25/18* (2013.01); *G10L 25/24* (2013.01)

(56) References Cited

U.S. PATENT DOCUMENTS

| | | | |
|---|---|---|---|
| 10,453,476 B1* | 10/2019 | Aryal | G06N 3/084 |
| 2006/0129399 A1* | 6/2006 | Turk | G10L 21/00 |
| | | | 704/256 |
| 2008/0082333 A1* | 4/2008 | Nurminen | G10L 21/00 |
| | | | 704/250 |
| 2018/0012613 A1* | 1/2018 | Sun | G10L 15/187 |
| 2018/0342256 A1* | 11/2018 | Huffman | G10L 15/22 |
| 2019/0066658 A1* | 2/2019 | Fujioka | G10L 15/16 |
| 2019/0251952 A1* | 8/2019 | Arik | G10L 13/033 |
| 2019/0286073 A1* | 9/2019 | Hosseini-Asi | G06N 3/02 |
| 2020/0365166 A1* | 11/2020 | Zhang | G10L 19/00 |

\* cited by examiner

VOICE CONVERSION TRAINING METHOD AND SERVER AND COMPUTER READABLE STORAGE MEDIUM

The present application is a continuation-application of International Application PCT/CN2019/130639 with an international filing date of Dec. 31, 2019.

BACKGROUND

1. Technical Field

The present disclosure relates to artificial intelligence technology, and particularly to a voice conversion training method as well as a server and a computer readable storage medium.

2. Description of Related Art

Voice conversion technology is a technology that converts a source voice into a target voice. The content of the source voice and the target voice are the same, but they are different in tone and style. The voice synthesized through the voice conversion technology based on signal processing method and traditional machine learning method is not natural and fluent sufficiently, and its effect is not good. The voice conversion technology based on deep learning can produce the voice with high similarity which is more fluent and natural, while it needs a large amount of voice data for training.

BRIEF DESCRIPTION OF THE DRAWINGS

To describe the technical schemes in the embodiments of the present disclosure or in the prior art more clearly, the following briefly introduces the drawings required for describing the embodiments or the prior art. Obviously, the drawings in the following description merely show some embodiments of the present disclosure. For those skilled in the art, other drawings can be obtained according to the drawings without creative efforts. In which.

DETAILED DESCRIPTION

The technical solutions in the embodiments of the present disclosure will be clearly and completely described below with reference to the drawings. Apparently, the described embodiments are part of the embodiments of the present disclosure, not all of the embodiments. Based on the embodiments of the present disclosure, all other embodiments obtained by those of ordinary skill in the art without creative work will fall within the protection scope of the present disclosure.

In the prior art, the voice synthesized through the voice conversion technology based on signal processing method and traditional machine learning method is not natural and fluent sufficiently, and its effect is not good. The voice conversion technology based on deep learning can produce the voice with high similarity which is more fluent and natural, while it needs a large amount of voice data for training.

In this embodiment, in order to address the above-mentioned problems, a voice conversion training method is provided, which is easy to operate and can effectively save time and storage space.

Figure 1:
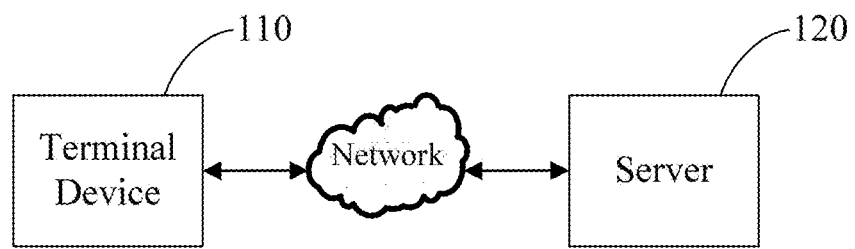
FIG. 1 is a schematic diagram of an application environment of a voice conversion training method according to an embodiment of the present disclosure.

FIG. 1 is a schematic diagram of an application environment of a voice conversion training method according to an embodiment of the present disclosure. Referring to FIG. 1, the voice conversion training method is applied to a voice conversion training system. The voice conversion training system includes a terminal device 110 and a server 120. The terminal device 110 and the server 120 are coupled through a network. The terminal device 110 can specifically be a desktop terminal or a mobile terminal. The mobile terminal can specifically be at least one of a mobile phone, a tablet computer, and a notebook computer, and the desktop terminal can specifically be a desktop computer. The server 120 can be implemented as an independent server or a server cluster composed of a plurality of servers. The terminal device 110 is configured to obtain personalized voice data groups, and the server 120 is configured to form a first training data set, where the first training data set includes a plurality of training voice data groups, each of the training voice data group includes a first quantity of training voice data, and any two of the training voice data is mutually parallel corpus; select two of the training voice data groups from the first training data set, take one of the two training voice data groups as a source voice data group, and the other of the two training voice data groups as a target voice data group; input the source voice data group and the target voice data group into the voice conversion neural network for training; form a second training data set, where the second training set includes the first training data set and a first source speaker voice data group; the first source speaker voice data group includes the first quantity of the first source speaker voice data, and the first source speaker voice data group and any of the training voice data is mutually parallel corpus; select one of the training voice data group from the first training data set as the target voice data group, and taking the source speaker voice data group as the source voice data group; and input the source voice data group and the target voice data group into the voice conversion neural network for training; and form a third training data set, where the third training data set includes a second source speaker voice data group and a personalized voice data group that are mutually parallel corpus, the second source speaker voice data group includes a second quantity of second source speaker voice data, and the personalized voice data group includes the second quantity of personalized voice data that is collected through, for example, a microphone of the terminal device 110, and the second quantity is smaller than the first quantity; take the second source speaker voice data group as the source voice data group, and take the personalized voice data group as the target voice data group; and input the source voice data group and the target voice data group into the voice conversion neural network for training.

Figure 2:
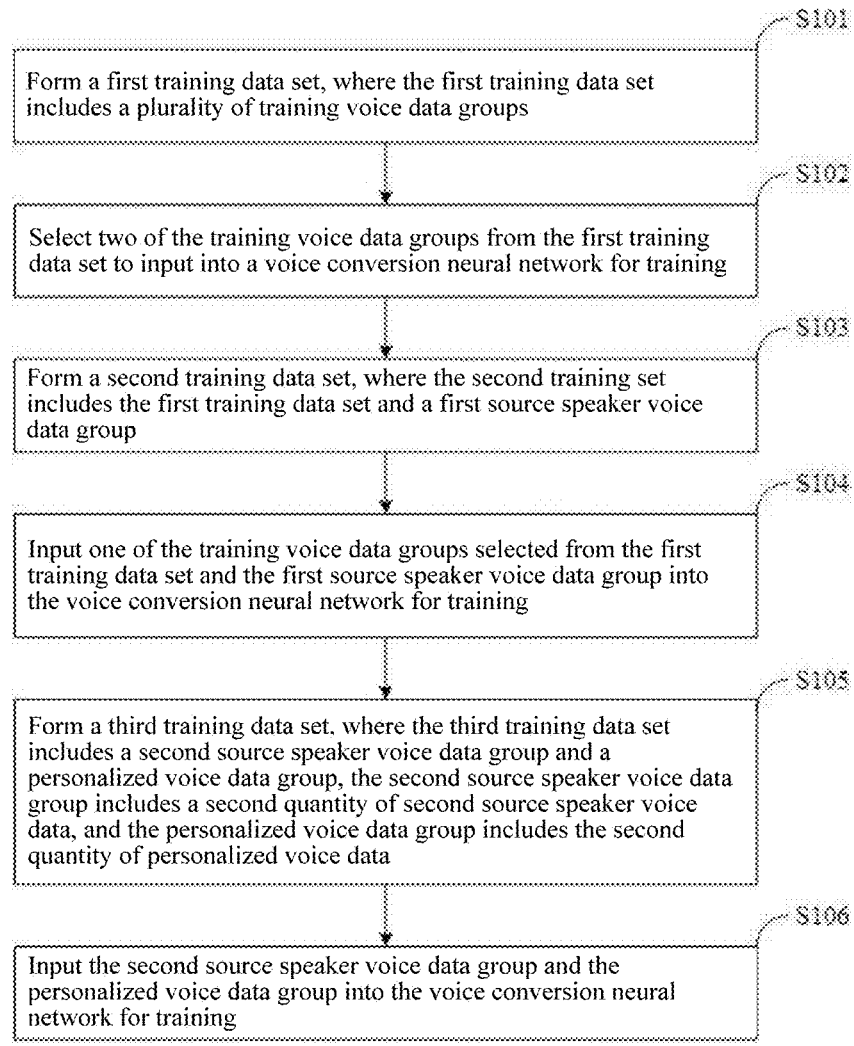
FIG. 2 is a flow chart of a first embodiment of a voice conversion training method according to the present disclosure.
Figure 7:
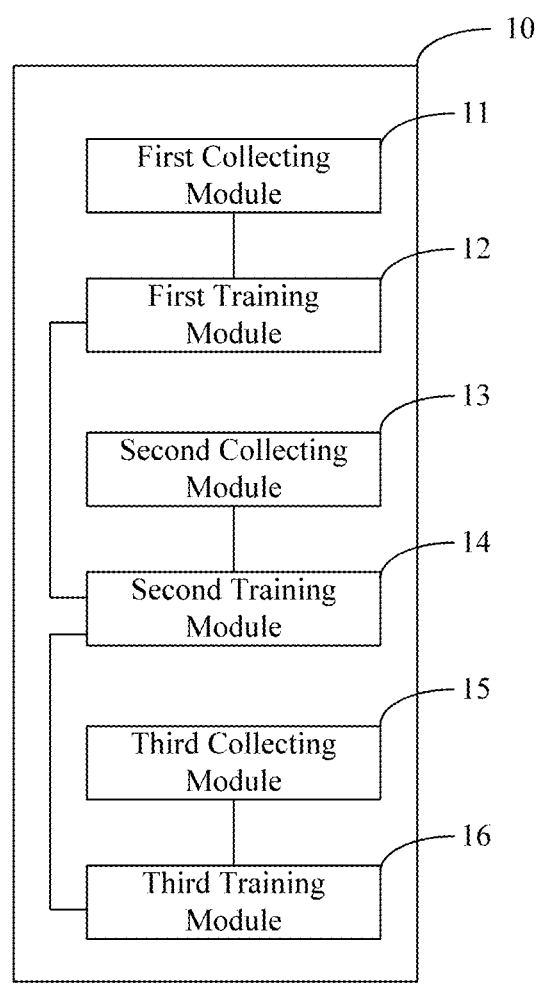
FIG. 7 is a block diagram of the structure of a first embodiment of a server according to an embodiment of the present disclosure.
Figure 9:
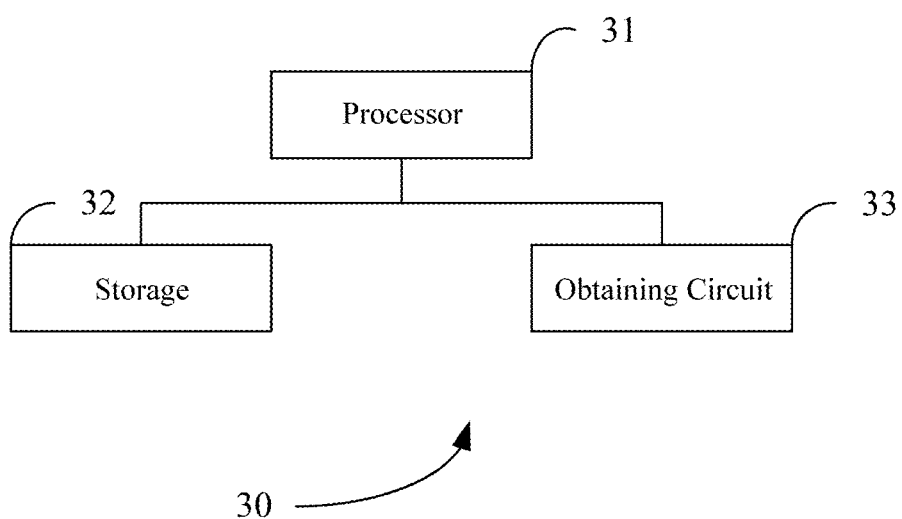
FIG. 9 is a block diagram of the structure of a third embodiment of a server according to an embodiment of the present disclosure.

FIG. 2 is a flow chart of a first embodiment of a voice conversion training method according to the present disclosure. In this embodiment, a voice conversion training method is provided. The method is a computer-implemented method executable for a processor, which may be implemented through and applied to the server 120 as shown in FIG. 1 or a server as shown in FIG. 7 or FIG. 9. Referring to FIG. 2, a voice conversion training method includes the following steps.

S101: forming a first training data set, where the first training data set includes a plurality of training voice data groups.

In a specific implementation scenario, the first training data set is formed. The first training data set includes a plurality of training voice data groups. Each training voice data group corresponds to each speaker, and any two training voice data groups are mutually parallel corpus, the text content of the voice in each training voice data group is the same. Each training voice data group includes the first quantity of the training voice data. In this implementation scenario, the first quantity is 300. In other implementation scenarios, the first quantity may also be 200, 500, and so on.

The first training data set can be provided by a merchant or service provider of, for example, the server 120 or the terminal device 110. The merchant or service provider can collect the data in advance or obtain the plurality of training voice data groups from a database, so as to from the first training data set.

S102: selecting two of the training voice data groups from the first training data set to input into a voice conversion neural network for training.

In a specific implementation scenario, two training voice data groups are selected from the first training data set, one of which is used as the source voice data group, and the other is used as the target voice data group. For example, in this implementation scenario, there are 10 training voice data groups, which can form 10 (i.e., the number of training voice data groups)*9 (i.e., the number of training voice data groups−1)*300 (i.e., the first quantity of the training voice data)=27000 pairs of different training combinations from source voice data to target voice data.

In this implementation scenario, two training voice data groups can be selected in sequence in the order of permutation and combination until all the training voice data groups in the first training data set are traversed.

In this implementation scenario, the selected source voice data group and target voice data group are input into the voice conversion neural network for training. Specifically, one source voice data is selected from the source voice data group, and one target voice data having the same text content as the source voice data is selected from the target voice data, and the pair of source voice data and target voice data is input into the voice conversion neural network for training.

S103: forming a second training data set, where the second training set includes the first training data set and a first source speaker voice data group.

In this implementation scenario, the second training data set is formed. The second training data set includes the first training data set and the first source speaker voice data group. The first source speaker voice data group includes a first quantity of first sources speaker voice data, and the first source speaker voice data group and any training voice data group are mutually parallel corpus.

In other implementation scenarios, the second training data set can also include the first source speaker voice data group and a plurality of voice data groups of other person, and the voice data group of other person includes the first quantity of other voice data, and any voice data group of other person and the first source speaker voice data groups are mutually parallel corpus. The voice data groups of other person can at least partially overlap with the first training data set, or can be not overlap.

S104: inputting one of the training voice data groups selected from the first training data set and the first source speaker voice data group into the voice conversion neural network for training.

In this implementation scenario, one training voice group is selected from the first training data set as the target voice data group, and the first source speaker voice data group is taken as the source voice data group. In this implementation scenario, each training voice data groups can be selected as the target voice data group in sequence until the first training data group is traversed.

In this implementation scenario, the selected source voice data group and target voice data group are input into the voice conversion neural network for training. Specifically, one source voice data is selected from the source voice data group, so as to select one target voice data having the same text content as the source voice data from the target voice data group, and the pair of source voice data and target voice data is input into the voice conversion neural network for training.

S105: forming a third training data set, where the third training data set includes a second source speaker voice data group and a personalized voice data group, the second source speaker voice data group includes a second quantity of second source speaker voice data, and the personalized voice data group includes the second quantity of personalized voice data.

In a specific implementation scenario, a third training data set is formed. The third training data set includes the second source speaker voice data group and the personalized voice data group that are mutually parallel corpus, where the second source speaker voice data group and the first source speaker voice data group correspond to the same speaker, the personalized voice data group is provided for the user, and can be a voice data group in which the user is the speaker. The second source speaker voice data group includes the second quantity of the second source speaker voice data, and the personalized voice data group includes the second quantity of the personalized voice data. The second quantity is smaller than the first quantity. Since the voice conversion neural network has fully fitted the phoneme distribution of speech conversion and produced an average model after two times of big data trainings, the second quantity can be a small value such as 20. On the basis of the average model, the personalized model can be obtained by fine-tuning, and the effect is good.

S106: inputting the second source speaker voice data group and the personalized voice data group into the voice conversion neural network for training.

In this implementation scenario, the second source speaker voice data group is used as the source voice data group, and the personalized voice data group is used as the target voice data group.

In this implementation scenario, the selected source voice data group and target voice data group are input into the voice conversion neural network for training. Specifically, one source voice data is selected from the source voice data group, and one target voice data having the same text content as the source voice data is selected from the target voice data, and then the pair of source voice data and target voice data is input into the voice conversion neural network for training.

It can be seen from the above-mentioned description that, in this embodiment, the voice conversion neural network is trained through the two training voice data groups in the first training data set first, so that the learning of the voice conversion neural network covers a large number of corpus to learn a sufficiently generalized probability distribution, and then enables the voice conversion neural network to learn the probability distribution of the conversion from the source speaker to different speakers through the conversion training of the first source speaker voice data group to a plurality of training voice data groups, and finally only a few second source speaker voice data and personalized voice data is needed to complete the training during the training of the source speaker to a designated speaker. In actual use, a merchant or service provider can provide the first training data set and the second training data set, and the user only needs to prepare a few voice data to train the voice conversion neural network, which is easy to operate and can effectively save time and storage space.

Figure 3:
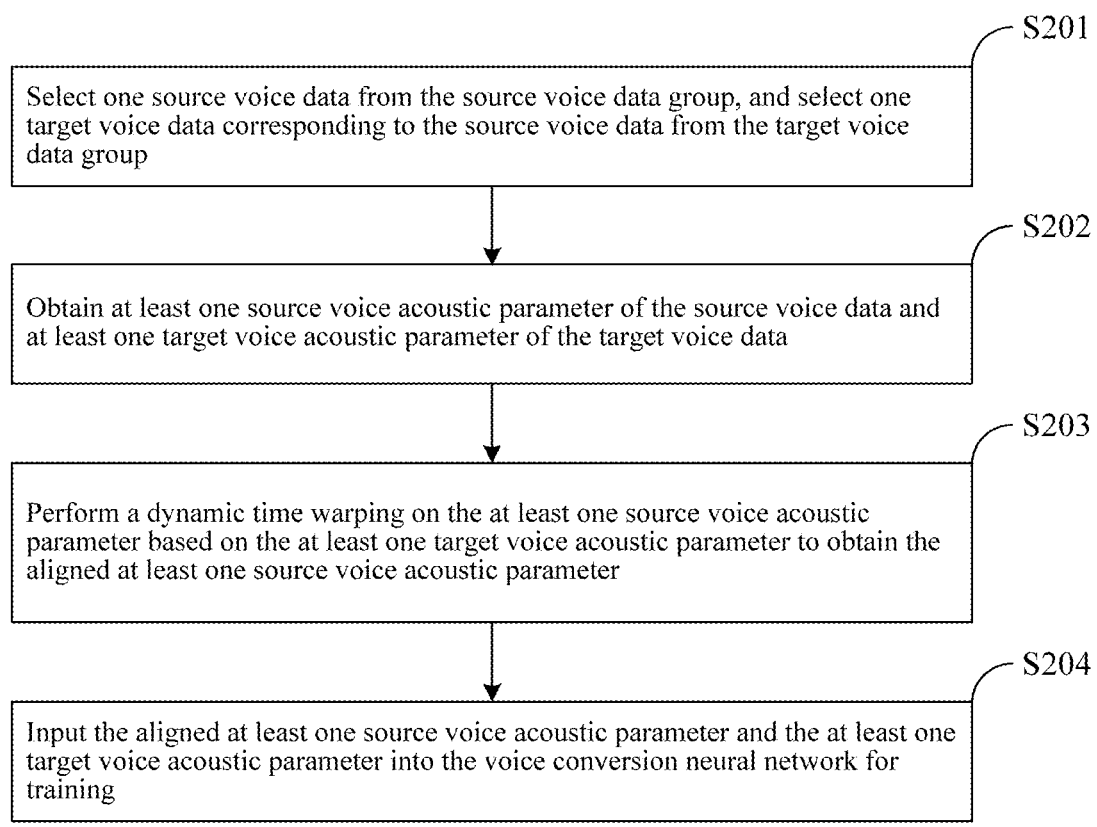
FIG. 3 is a flow chart of an embodiment of training a voice conversion neural network in the voice conversion training method according to the present disclosure.

FIG. 3 is a flow chart of an embodiment of training a voice conversion neural network in the voice conversion training method according to the present disclosure. Referring to FIG. 3, a method of training a voice conversion neural network in the voice conversion training method includes the following steps.

S201: selecting one source voice data from the source voice data group, and selecting one target voice data corresponding to the source voice data from the target voice data group.

In a specific implementation scenario, one source voice data is selected from the source voice data group, one target voice data with the same text content as the source voice data is selected from the target voice data, and the pair of source voice data and target voice data is used for training.

S202: obtaining at least one source voice acoustic parameter of the source voice data and at least one target voice acoustic parameter of the target voice data.

In this implementation scenario, at least one source voice acoustic parameter of the source voice data and at least one target voice acoustic parameter of the target voice data are obtained, respectively. For example, the source voice data and the target voice data can be analyzed through a World voice feature analyzer to obtain the at least one source voice acoustic parameter and the at least one target voice acoustic parameter, respectively.

In this implementation scenario, the source voice data and the target voice data is respectively analyzed through the World voice feature analyzer, and at least one of the frequency spectrum, the fundamental frequency and the non-periodic frequency of the source voice data and the target voice data is obtained, respectively.

In other implementation scenarios, the at least one source voice acoustic parameter and the at least one target voice acoustic parameter further include the unvoiced/voiced sound of the source voice data and the unvoiced/voiced sound of the target voice. It can calculate the logarithms of the fundamental frequencies of the source voice data and the target voice data, thereby obtaining the unvoiced/voiced sound of the source voice data and the unvoiced/voiced sound of the target voice according to the logarithm of the fundamental frequency of the source voice data and the logarithm of the fundamental frequency of the target voice data, respectively.

In this implementation scenario, before obtaining the at least one source voice acoustic parameter of the source voice data and at least one target voice acoustic parameter of the target voice data, the source voice data and the target voice data is resampled first.

S203: performing a dynamic time warping on the at least one source voice acoustic parameter based on the at least one target voice acoustic parameter to obtain the aligned at least one source voice acoustic parameter.

Figure 4:
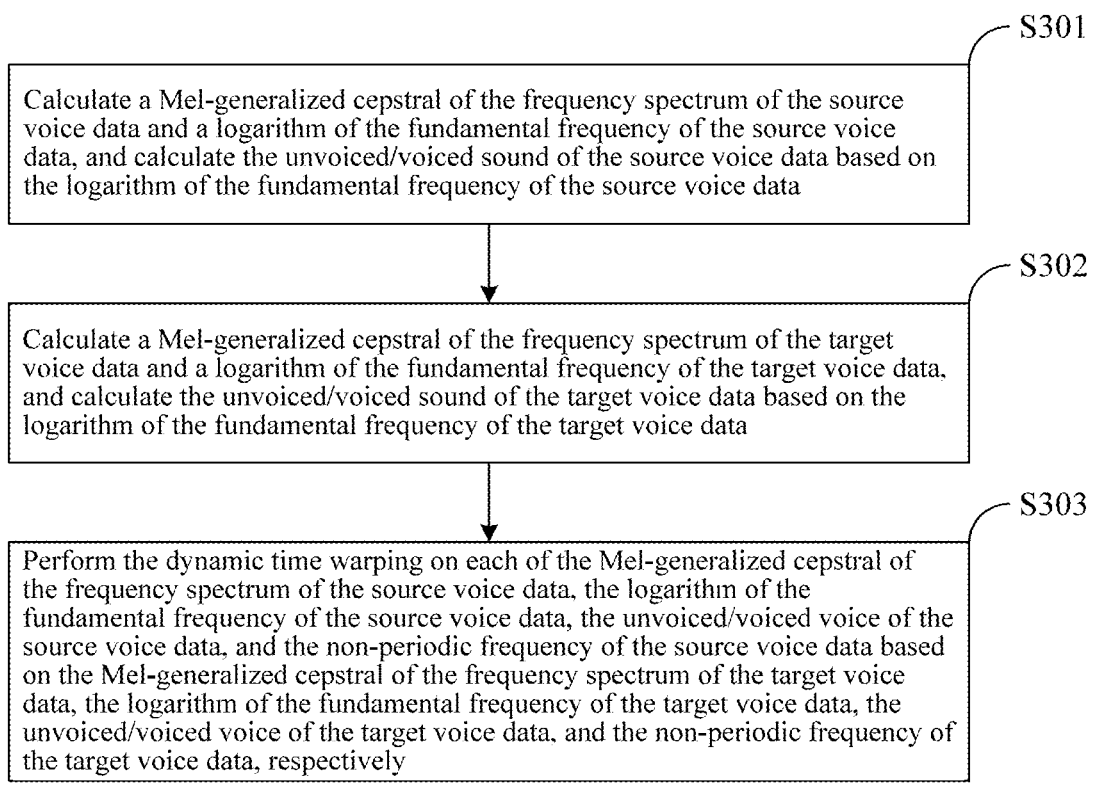
FIG. 4 is a flow chart of an embodiment of a dynamic time warping in the voice conversion training method according to the present disclosure.

In this implementation scenario, because different people speak at different speech speeds, the time required to speak the same sentence is different, and the time of the same pronunciation phoneme is also different. Therefore, it is necessary to perform the dynamic time warping on the at least one source voice acoustic parameter according to at least one target voice acoustic parameter. FIG. 4 is a flow chart of an embodiment of a dynamic time warping in the voice conversion training method according to the present disclosure. Specifically, referring to FIG. 4, a method of the dynamic time warping in the voice conversion training method includes the following steps.

S301: calculating a Mel-generalized cepstral of the frequency spectrum of the source voice data and a logarithm of the fundamental frequency of the source voice data, and calculating the unvoiced/voiced sound of the source voice data based on the logarithm of the fundamental frequency of the source voice data.

In a specific implementation scenario, the Mel-generalized cepstral of the frequency spectrum of the source voice data is obtained through the voice signal processing tool SPTK. The logarithm of the fundamental frequency of the source voice data is calculated through the formula of:

$$lf_0 = \log_2 f_0;$$

where $f_0$ is the fundamental frequency of the source voice data. The unvoiced/voiced voice of the source voice data is calculated according to the logarithm of the fundamental frequency of the source voice data.

S302: calculating a Mel-generalized cepstral of the frequency spectrum of the target voice data and a logarithm of the fundamental frequency of the target voice data, and calculating the unvoiced/voiced sound of the target voice data based on the logarithm of the fundamental frequency of the target voice data.

In this implementation scenario, the methods of obtaining the Mel-generalized cepstral of the fundamental frequency, the logarithm of the fundamental frequency, and the unvoiced/voiced sound, of the target voice data is basically the same as that of the source voice data, which will not be repeated herein.

S303: performing the dynamic time warping on each of the Mel-generalized cepstral of the frequency spectrum of the source voice data, the logarithm of the fundamental frequency of the source voice data, the unvoiced/voiced voice of the source voice data, and the non-periodic frequency of the source voice data based on the Mel-generalized cepstral of the frequency spectrum of the target voice data, the logarithm of the fundamental frequency of the target voice data, the unvoiced/voiced voice of the target voice data, and the non-periodic frequency of the target voice data, respectively.

In this implementation scenario, they need to be aligned in length on the time axis before they can be sent to the neural network. Herein, the dynamic time warping method is used to align the acoustic features of the source voice to the acoustic features of the target voice in its length. The function to measure the distance between frames at time t is:

$$Distance_{I_t, J_t} = \frac{1}{N} \times \sum_{n=1}^{N} (I_{tn} - J_{tn})^2;$$

where, I and J are characteristic matrices, and the dimension is T (number of frames)×N (characteristic dimension).

Figure 5:
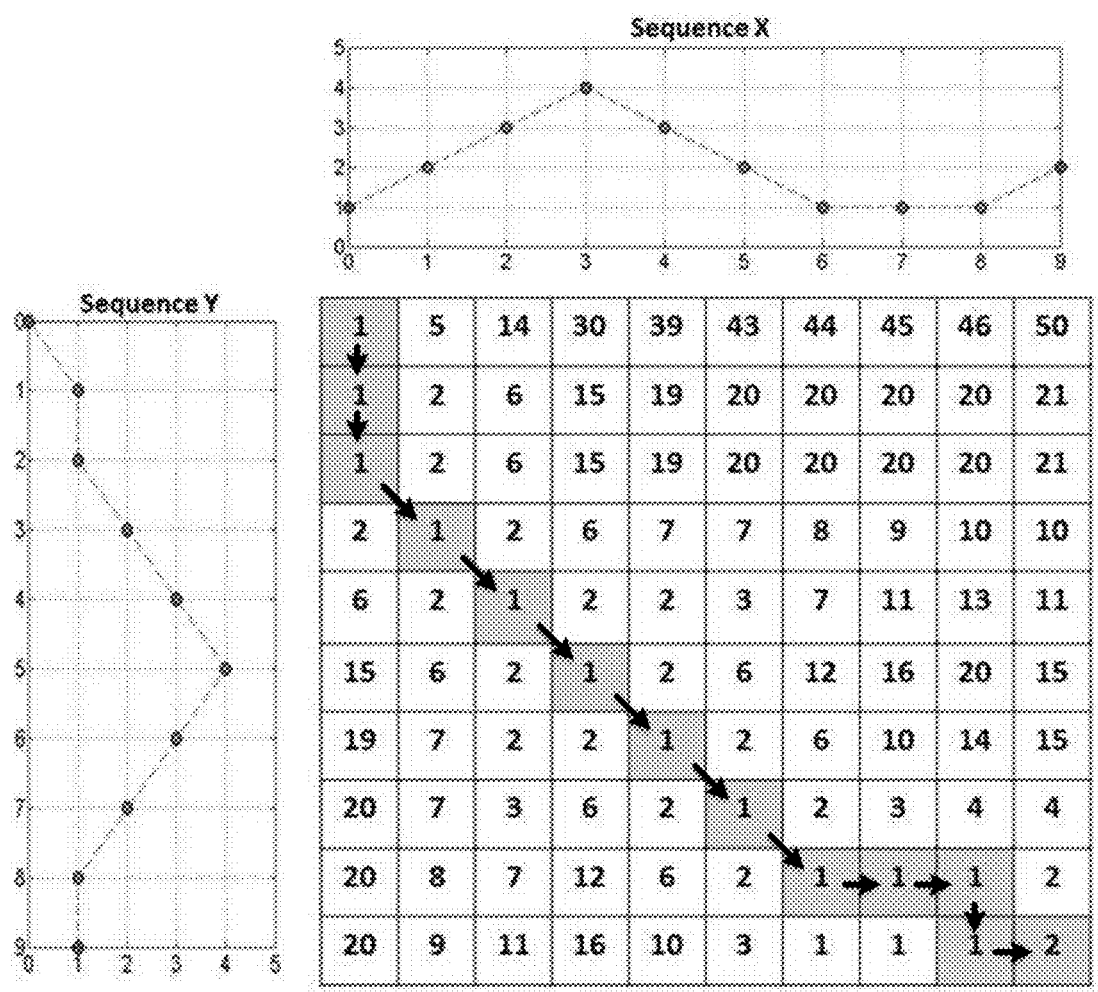
FIG. 5 is a schematic diagram of dynamic time warping.

FIG. 5 is a schematic diagram of dynamic time warping. Referring to FIG. 5, the principle of dynamic time warping is shown. As shown in FIG. 5, the Y-axis represents the acoustic feature Y, and the X-axis represents the acoustic feature X. Each coordinate point (x, y) represents the Euclidean distance from the element x in the acoustic feature X to the element y in the acoustic feature Y. The goal is to find the shortest path from the upper left to lower right of the figure so that the sum of the total distances is the shortest. In which, the path identified by the arrow is the shortest path that can be found using a dynamic planning algorithm.

In this implementation scenario, the dynamic time warping is performed on the Mel-generalized cepstral of the frequency spectrum of the source voice data based on the Mel-generalized cepstral of the frequency spectrum of the target voice data, and the dynamic time warping is performed on the logarithm of the fundamental frequency of the source voice data based on the logarithm of the fundamental frequency of the target voice data, the dynamic time warping is performed on the unvoiced/voiced sounds of the source voice data based the unvoiced/voiced sounds of the target voice data, and the dynamic time warping is performed on the non-periodic frequency of the source voice data based on the non-periodic frequency of the target voice data.

S204: inputting the aligned at least one source voice acoustic parameter and the at least one target voice acoustic parameter into the voice conversion neural network for training.

In this implementation scenario, after alignment, there is at least one source voice acoustic parameter which is a T×N matrix x, and at least one target voice acoustic parameter which is a matrix y. The matrix x and matrix y are input into a bidirectional long short-term memory (LSTM) neural network for training.

In this implementation scenario, the voice conversion neural network is the bidirectional LSTM neural network. The parameters that define the bidirectional LSTM neural network are as follows:

| | |
|---|---|
| Input dense layer | In dimension: 130 |
| | Out dimension: 512 |
| BLSTM | Hidden units: 512 |

| | |
|---|---|
| | Layers: 3 |
| Output dense layer | In dimension: 512 |
| | Out dimension: 130 |

The outputted converted voice acoustic feature $\hat{y}$ is a T×N matrix. The loss function is defined as:

$$loss = (y - \hat{y})^2.$$

Based on the calculated loss, gradient descent is performed, the weights of the parameters of the neural network are updated, and whether the training is over is determined based on the result of the loss function.

It can be seen from the above-mentioned description that, in this embodiment, by performing the dynamic time warping on the at least one source voice acoustic parameter of the source voice data and the at least one target voice acoustic parameter of the target voice, the accuracy of training can be further improved, thereby improving the accuracy of conversion.

Figure 6:
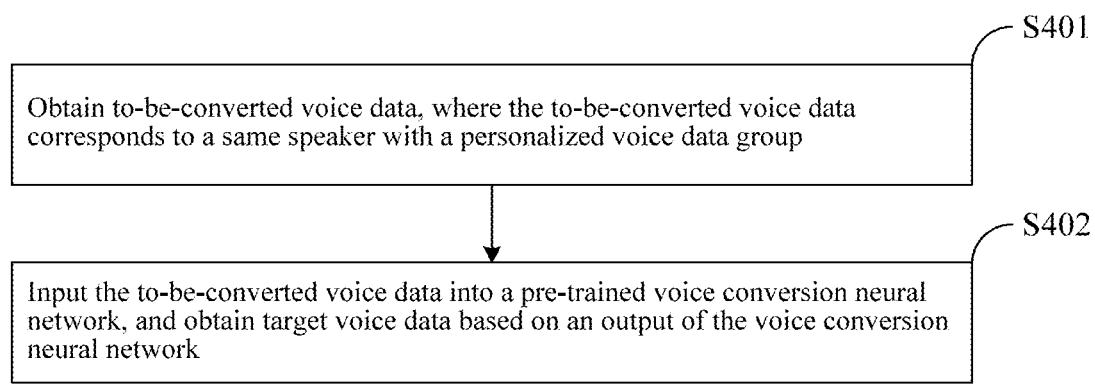
FIG. 6 is a flow chart of a voice conversion method according to an embodiment of the present disclosure.
Figure 8:
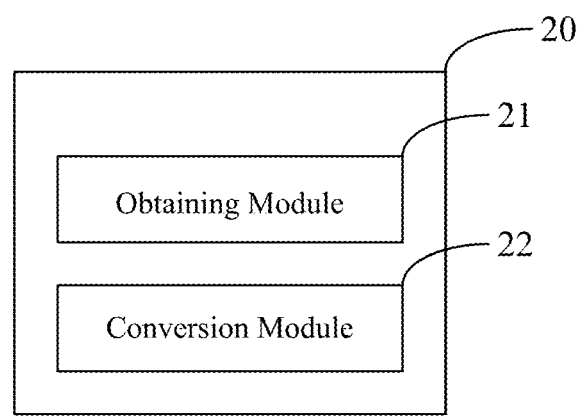
FIG. 8 is a block diagram of the structure of a second embodiment of a server according to an embodiment of the present disclosure.
Figure 10:
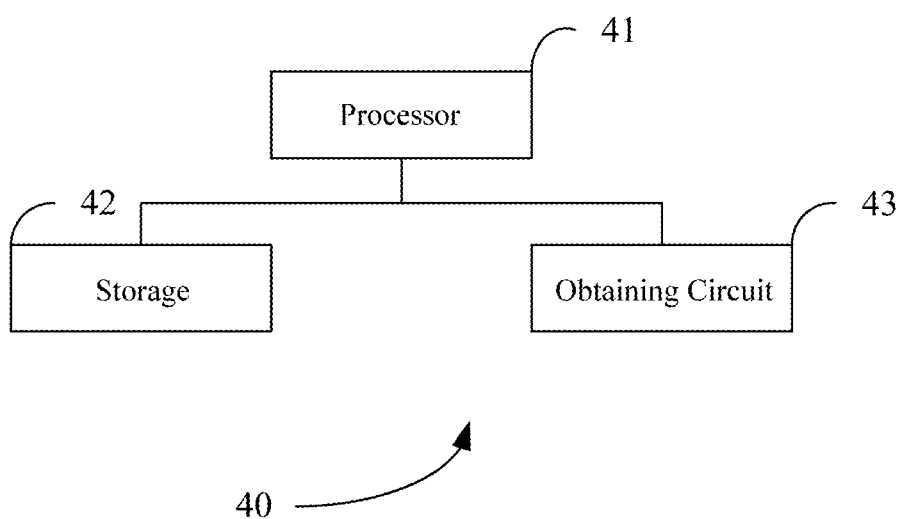
FIG. 10 is a block diagram of the structure of a fourth embodiment of a server according to an embodiment of the present disclosure.

FIG. 6 is a flow chart of a voice conversion method according to an embodiment of the present disclosure. In this embodiment, a voice conversion method is provided. The method is a computer-implemented method executable for a processor, which may be implemented through and applied to the server 120 as shown in FIG. 1 or a server as shown in FIG. 8 or FIG. 10. Referring to FIG. 6, a voice conversion method includes the following steps.

S401: obtaining to-be-converted voice data, where the to-be-converted voice data corresponds to a same speaker with a personalized voice data group.

In a specific implementation scenario, the to-be-converted voice data is obtained, and the voice data corresponds to the same speaker with the personalized voice data group when training the voice conversion neural network.

In this implementation scenario, after obtaining the to-be-converted voice data, at least one to-be-converted voice acoustic parameter of the voice data is obtained, which includes at least one of the fundamental frequency, frequency spectrum, and non-periodic frequency of the to-be-converted voice data. The method of obtaining the at least one to-be-converted voice acoustic parameters is basically the same as that in the forgoing, which will not be repeated herein.

In this implementation scenario, before obtaining the at least one to-be-converted voice acoustic parameter, the to-be-converted voice acoustic parameter is resampled.

S402: inputting the to-be-converted voice data into a pre-trained voice conversion neural network, and obtaining target voice data based on an output of the voice conversion neural network.

In this implementation scenario, the at least one to-be-converted voice acoustic parameter of the to-be-converted voice data is input into the pre-trained voice conversion neural network, and the voice conversion neural network is trained by the method shown in FIG. 2 to FIG. 3, hence it can output at least one target acoustic parameter.

The at least one target acoustic parameter includes the Mel-generalized cepstral of the target voice data, the logarithm of the fundamental frequency of the target voice data, and the non-periodic frequency of the target voice data. Smoothing is performed on at least one target acoustic parameter through maximum likelihood parameter generation (MLPG). Then the Mel-generalized cepstral of the target voice data is converted into the frequency spectrum of the target voice data through the voice signal processing tool SPTK, the fundamental frequency of the target voice data is calculated based on the logarithm of the fundamental frequency of the target voice data, and the frequency spectrum the, fundamental frequency, and non-periodic frequency of the target voice data is input into the World voice feature analyzer or a Wavenet vocoder to obtain the target voice data.

It can be seen from the above-mentioned description that, in this embodiment, by inputting the to-be-converted voice data into the pre-trained voice conversion neural network, and obtaining the target voice data based on the output of the voice conversion neural network, the target voice data can be accurately obtained.

FIG. 7 is a block diagram of the structure of a first embodiment of a server according to an embodiment of the present disclosure. In this embodiment, a server 10 is provided. The may be the server 120 as shown in FIG. 1. Referring to FIG. 7, the server 10 includes a first collecting module 11, a first training module 12, a second collecting module 13, a second training module 14, a third collecting module 15, and a third training module 16. The first collecting module 11 is configured to form a first training data set, where the first training data set includes a plurality of training voice data groups. The first training module 12 is configured to select two training voice data groups from the first training data set to input into a voice conversion neural network for training. The second set module 13 is configured to form a second training data set, where the second training set includes the first training data set and a first source speaker voice data group. The second training module 14 is configured to select one training voice data group and one source speaker voice data group from the first training data set to input the voice conversion neural network for training. The third set module 15 is configured to form a third training data set, where the third training data set includes a second source speaker voice data group and a personalized voice data group. The second source speaker voice data group includes a second quantity of second source speaker voice data and corresponds to a same speaker with the first source speaker voice data group, and the personalized voice data group includes the second quantity of personalized voice data, where the second quantity is smaller than a first quantity. The third training module 16 is configured to input the second source speaker voice data group and the personalized voice data group into the voice conversion neural network for training.

In which, each of the training voice data group includes the first quantity of training voice data, and any two of the training voice data is mutually parallel corpus; the first source speaker voice data group includes the first quantity of the first source speaker voice data, and the first source speaker voice data group and any of the training voice data is mutually parallel corpus; the second source speaker voice data group and the personalized voice data group are mutually parallel corpus.

The first training module 12 is configured to take one of the two training voice data groups as a source voice data group, and the other of the two training voice data groups as a target voice data group; and input the source voice data group and the target voice data group into the voice conversion neural network for training.

The second training module 14 is configured to select one of the training voice data group from the first training data set as the target voice data group, and take the source speaker voice data group as the source voice data group; and input the source voice data group and the target voice data group into the voice conversion neural network for training.

The third training module 16 is configured to take the second source speaker voice data group as the source voice data group, and take the personalized voice data group as the target voice data group; and input the source voice data group and the target voice data group into the voice conversion neural network for training.

The first training module 12, the second training module 14, and the third training module 16 are further configured to select one source voice data from the source voice data group, and selecting one target voice data corresponding to the source voice data from the target voice data group; obtain at least one source voice acoustic parameter of the source voice data and at least one target voice acoustic parameter of the target voice data; perform a dynamic time warping on the at least one source voice acoustic parameter based on the at least one target voice acoustic parameter to obtain the aligned at least one source voice acoustic parameter; and input the aligned at least one source voice acoustic parameter and the at least one target voice acoustic parameter into the voice conversion neural network for training.

In which, the at least one source voice acoustic parameter includes at least one of a frequency spectrum, a fundamental frequency, a non-periodic frequency, and an unvoiced/voiced sound of the source voice data; and the at least one target voice acoustic parameter includes at least one of a frequency spectrum, a fundamental frequency, a non-periodic frequency, and an unvoiced/voiced sound of the target voice data.

The first training module 12, the second training module 14, and the third training module 16 are further configured to obtain at least one of the frequency spectrum, the fundamental frequency, and the non-periodic frequency of the source voice data and at least one of the frequency spectrum, the a fundamental frequency, and the non-periodic frequency of the target voice data through a voice feature analyzer.

The first training module 12, the second training module 14, and the third training module 16 are further configured to calculate a Mel-generalized cepstral of the frequency spectrum of the source voice data and a logarithm of the fundamental frequency of the source voice data, and calculating the unvoiced/voiced sound of the source voice data based on the logarithm of the fundamental frequency of the source voice data; calculate a Mel-generalized cepstral of the frequency spectrum of the target voice data and a logarithm of the fundamental frequency of the target voice data, and calculating the unvoiced/voiced sound of the target voice data based on the logarithm of the fundamental frequency of the target voice data; and perform the dynamic time warping on each of the Mel-generalized cepstral of the frequency spectrum of the source voice data, the logarithm of the fundamental frequency of the source voice data, the unvoiced/voiced voice of the source voice data, and the non-periodic frequency of the source voice data based on the Mel-generalized cepstral of the frequency spectrum of the target voice data, the logarithm of the fundamental frequency of the target voice data, the unvoiced/voiced voice of the target voice data, and the non-periodic frequency of the target voice data, respectively.

The first training module 12, the second training module 14, and the third training module 16 are further configured to resample the source voice data and the target voice data. In which, the voice conversion neural network is a LSTM neural network.

It can be seen from the above-mentioned description that, in the smart device of this embodiment, the voice conversion neural network is trained through the two training voice data groups in the first training data set first, so that the learning of the voice conversion neural network covers a large number of corpus to learn a sufficiently generalized probability distribution, and then enables the voice conversion neural network to learn the probability distribution of the conversion from the source speaker to different speakers through the conversion training of the first source speaker voice data group to a plurality of training voice data groups, and finally only a few second source speaker voice data and personalized voice data is needed to complete the training during the training of the source speaker to a designated speaker. In actual use, a merchant or service provider can provide the first training data set and the second training data set, and the user only needs to prepare a few voice data to train the voice conversion neural network, which is easy to operate and can effectively save time and storage space.

FIG. 8 is a block diagram of the structure of a second embodiment of a server according to an embodiment of the present disclosure. In this embodiment, a server 20 is provided. The may be the server 120 as shown in FIG. 1. Referring to FIG. 8. the server 20 includes an obtaining module 21 and a conversion module 22. The obtaining module 21 is configured to obtain to-be-converted voice data, where the to-be-converted voice data corresponds to a same speaker with a personalized voice data group. The conversion module 22 is configured to input the to-be-converted voice data into a pre-trained voice conversion neural network, and obtain target voice data based on an output of the voice conversion neural network.

The conversion module 22 is further configured to obtain at least one to-be-converted voice acoustic parameter of the to-be-converted voice data, where the at least one to-be-converted voice parameter includes at least one of a fundamental frequency, a frequency spectrum, and a non-periodic frequency of the to-be-converted voice data; and input the at least one to-be-converted voice parameter of the to-be-converted voice data into the voice conversion neural network.

The conversion module 22 is further configured to resample the to-be-converted voice parameter.

In which, the output of the voice conversion neural network includes at least one target acoustic parameter of the target voice data. The at least one target acoustic parameter includes a Mel-generalized cepstral of the target voice data, a logarithm of a fundamental frequency of the target voice data, and a non-periodic frequency of the target voice data.

The conversion module 22 is further configured to calculate the frequency spectrum of the target voice data based on the Mel-generalized cepstral of the target voice data, and calculating the fundamental frequency of the target voice data based on the logarithm of the fundamental frequency of the target voice data; and synthesize the frequency spectrum of the target voice data, the fundamental frequency of the target voice data, and the non-periodic frequency of the target voice data to obtain the target voice data.

The conversion module 22 is further configured to smooth the at least one target acoustic parameter.

It can be seen from the above-mentioned description that, in this embodiment, by inputting the to-be-converted voice data into the pre-trained voice conversion neural network, and obtaining the target voice data based on the output of the voice conversion neural network, the target voice data can be accurately obtained.

FIG. 9 is a block diagram of the structure of a third embodiment of a server according to an embodiment of the present disclosure. In this embodiment, a server 30 is provided. The may be the server 120 as shown in FIG. 1. Referring to FIG. 9, the server 30 includes a processor 31, a storage 32, and an obtaining circuit 33. The processor 31 is coupled to the storage 32 and the obtaining circuit 33. A computer program is stored in the storage 32, and the processor 31 executes the computer program when it is operated so as to implement the methods shown in FIG. 2, FIG. 3, and FIG. 4. The detailed method can be referred to the above, which will not be repeated herein.

It can be seen from the above-mentioned description that, in the smart device of this embodiment, the voice conversion neural network is trained through the two training voice data groups in the first training data set first, so that the learning of the voice conversion neural network covers a large number of corpus to learn a sufficiently generalized probability distribution, and then enables the voice conversion neural network to learn the probability distribution of the conversion from the source speaker to different speakers through the conversion training of the first source speaker voice data group to a plurality of training voice data groups, and finally only a few second source speaker voice data and personalized voice data is needed to complete the training during the training of the source speaker to a designated speaker. In actual use, a merchant or service provider can provide the first training data set and the second training data set, and the user only needs to prepare a few voice data to train the voice conversion neural network, which is easy to operate and can effectively save time and storage space.

FIG. 10 is a block diagram of the structure of a fourth embodiment of a server according to an embodiment of the present disclosure. In this embodiment, a server 40 is provided. The may be the server 120 as shown in FIG. 1. Referring to FIG. 10, the server 40 includes a processor 41, a storage 42 and an obtaining circuit 43. The processor 41 is coupled to the storage 42 and the obtaining circuit 43. The storage 42 stores a computer program, and the processor 41 executes the computer program when it is operated so as to implement the method shown in FIG. 6. The detailed method can be referred to above, which will not be repeated herein.

It can be seen from the above-mentioned description that, in this embodiment, by inputting the to-be-converted voice data into the pre-trained voice conversion neural network, and obtaining the target voice data based on the output of the voice conversion neural network, the target voice data can be accurately obtained.

Figure 11:
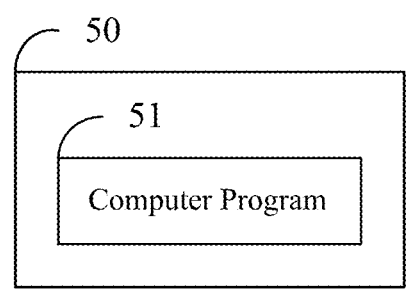
FIG. 11 is a block diagram of the structure of a computer readable storage medium according to an embodiment of the present disclosure.

FIG. 11 is a block diagram of the structure of a computer readable storage medium according to an embodiment of the present disclosure. Referring to FIG. 11, a non-transitory computer readable storage medium 50 stores at least one computer program 51, and the computer program 51 is configured to implement the method shown in FIG. 2-FIG. 4 or FIG. 6 when executed by a processor. The detailed method can be referred to the above, which will not be repeated herein. In an embodiment, the storage medium 50 can be a storage chip in a terminal device, a hard disk, or a mobile hard disk, or other readable and writable storage tools such as a USB flash drive or an optical disk, or can also be a server or the like.

It can be seen from the above-mentioned description that, in the smart device of this embodiment, the voice conversion neural network is trained through the two training voice data groups in the first training data set first, so that the learning of the voice conversion neural network covers a large number of corpus to learn a sufficiently generalized probability distribution, and then enables the voice conversion neural network to learn the probability distribution of the conversion from the source speaker to different speakers through the conversion training of the first source speaker voice data group to a plurality of training voice data groups, and finally only a few second source speaker voice data and personalized voice data is needed to complete the training during the training of the source speaker to a designated speaker. In actual use, a merchant or service provider can provide the first training data set and the second training data set, and the user only needs to prepare a few voice data to train the voice conversion neural network, which is easy to operate and can effectively save time and storage space.

The above-disclosed are only preferred embodiments of the present disclosure. Of course, the scope of rights of the present disclosure cannot be limited by this. Therefore, equivalent changes made according to the claims of the present disclosure still fall within the scope of the present disclosure.

What is claimed is:

1. A voice conversion training method, comprising steps of:
   forming a first training data set, wherein the first training data set comprises a plurality of training voice data groups;
   selecting two of the training voice data groups from the first training data set to input into a voice conversion neural network for training;
   forming a second training data set, wherein the second training set comprises the first training data set and a first source speaker voice data group;
   inputting one of the training voice data groups selected from the first training data set and the first source speaker voice data group into the voice conversion neural network for training;
   forming a third training data set, wherein the third training data set comprises a second source speaker voice data group and a personalized voice data group, the second source speaker voice data group comprises a second quantity of second source speaker voice data and corresponds to a same speaker with the first source speaker voice data group, and the personalized voice data group comprises the second quantity of personalized voice data; wherein the personalized voice data group is obtained from a terminal device;
   inputting the second source speaker voice data group and the personalized voice data group into the voice conversion neural network for training;
   obtaining to-be-converted voice data, wherein the to-be-converted voice data corresponds to a same speaker with the personalized voice data group; and
   inputting the to-be-converted voice data into the voice conversion neural network, and obtaining target voice data based on an output of the voice conversion neural network.

2. The method of claim 1, wherein:
   each of the training voice data group comprises a first quantity of training voice data, and any two of the training voice data is parallel corpus with respect to each other, wherein the second quantity is smaller than the first quantity;
   the first source speaker voice data group comprises the first quantity of the first source speaker voice data, and the first source speaker voice data group and any of the training voice data is parallel corpus with respect to each other; and
   the second source speaker voice data group and the personalized voice data group are parallel corpus with respect to each other.

3. The method of claim 2, wherein the step of selecting the two of the training voice data groups from the first training data set to input into the voice conversion neural network for training comprises:
   taking one of the two training voice data groups as a source voice data group, and the other of the two training voice data groups as the target voice data group; and
   inputting the source voice data group and the target voice data group into the voice conversion neural network for training;
   the step of inputting one of the training voice data groups selected from the first training data set and the first source speaker voice data group into the voice conversion neural network for training comprises:
   selecting one of the training voice data group from the first training data set as the target voice data group, and taking the source speaker voice data group as the source voice data group; and
   inputting the source voice data group and the target voice data group into the voice conversion neural network for training; and
   the step of inputting the second source speaker voice data group and the personalized voice data group are into the voice conversion neural network for training comprises:
   taking the second source speaker voice data group as the source voice data group, and taking the personalized voice data group as the target voice data group; and
   inputting the source voice data group and the target voice data group into the voice conversion neural network for training.

4. The method of claim 3, wherein the step of inputting the source voice data group and the target voice data group into the voice conversion neural network for training comprises:
   selecting one source voice data from the source voice data group, and selecting one target voice data corresponding to the source voice data from the target voice data group;
   obtaining at least one source voice acoustic parameter of the source voice data and at least one target voice acoustic parameter of the target voice data;
   performing a dynamic time warping on the at least one source voice acoustic parameter based on the at least one target voice acoustic parameter to obtain the aligned at least one source voice acoustic parameter; and
   inputting the aligned at least one source voice acoustic parameter and the at least one target voice acoustic parameter into the voice conversion neural network for training.

5. The method of claim 3, wherein:
   the at least one source voice acoustic parameter comprises at least one of a frequency spectrum, a fundamental frequency, a non-periodic frequency, and an unvoiced/voiced sound of the source voice data obtained through a voice feature analyzer; and
   the at least one target voice acoustic parameter comprises at least one of a frequency spectrum, a fundamental frequency, a non-periodic frequency, and an unvoiced/voiced sound of the target voice data obtained through the voice feature analyzer.

6. The method of claim 5, wherein the step of performing the dynamic time warping on the at least one source voice acoustic parameter based on the at least one target voice acoustic parameter comprises:

calculating a Mel-generalized cepstral of the frequency spectrum of the source voice data and a logarithm of the fundamental frequency of the source voice data, and calculating the unvoiced/voiced sound of the source voice data based on the logarithm of the fundamental frequency of the source voice data;

calculating a Mel-generalized cepstral of the frequency spectrum of the target voice data and a logarithm of the fundamental frequency of the target voice data, and calculating the unvoiced/voiced sound of the target voice data based on the logarithm of the fundamental frequency of the target voice data; and performing the dynamic time warping on each of the Mel-generalized cepstral of the frequency spectrum of the source voice data, the logarithm of the fundamental frequency of the source voice data, the unvoiced/voiced voice of the source voice data, and the non-periodic frequency of the source voice data based on the Mel-generalized cepstral of the frequency spectrum of the target voice data, the logarithm of the fundamental frequency of the target voice data, the unvoiced/voiced voice of the target voice data, and the non-periodic frequency of the target voice data, respectively.

7. The method of claim 1, wherein the step of inputting the to-be-converted voice data into the voice conversion neural network comprises:

obtaining at least one to-be-converted voice parameter of the to-be-converted voice data, wherein the at least one to-be-converted voice parameter comprises at least one of a fundamental frequency, a frequency spectrum, and a non-periodic frequency of the to-be-converted voice data; and inputting the at least one to-be-converted voice parameter of the to-be-converted voice data into the voice conversion neural network.

8. The method of claim 7, wherein:

the output of the voice conversion neural network comprises at least one target acoustic parameter of the target voice data;

the at least one target acoustic parameter comprises a Mel-generalized cepstral of the target voice data, a logarithm of a fundamental frequency of the target voice data, and a non-periodic frequency of the target voice data;

the step of obtaining the target voice data based on the output of the voice conversion neural network comprises:

calculating the frequency spectrum of the target voice data based on the Mel-generalized cepstral of the target voice data, and calculating the fundamental frequency of the target voice data based on the logarithm of the fundamental frequency of the target voice data; and synthesizing the frequency spectrum of the target voice data, the fundamental frequency of the target voice data, and the non-periodic frequency of the target voice data to obtain the target voice data.

9. A server comprising an obtaining circuit, a processor, and a memory, wherein the processor is coupled to the memory and the obtaining circuit, the memory stores one or more computer programs executable on the processor; wherein the one or more computer programs comprise:

instructions for forming a first training data set, wherein the first training data set comprises a plurality of training voice data groups;

instructions for selecting two of the training voice data groups from the first training data set to input into a voice conversion neural network for training;

instructions for forming a second training data set, wherein the second training set comprises the first training data set and a first source speaker voice data group;

instructions for inputting one of the training voice data groups selected from the first training data set and the first source speaker voice data group into the voice conversion neural network for training;

instructions for forming a third training data set, wherein the third training data set comprises a second source speaker voice data group and a personalized voice data group, the second source speaker voice data group comprises a second quantity of second source speaker voice data and corresponds to a same speaker with the first source speaker voice data group, and the personalized voice data group comprises the second quantity of personalized voice data; wherein the personalized voice data group is obtained from a terminal device;

instructions for inputting the second source speaker voice data group and the personalized voice data group into the voice conversion neural network for training;

instructions for obtaining to-be-converted voice data, wherein the to-be-converted voice data corresponds to a same speaker with the personalized voice data group; and instructions for inputting the to-be-converted voice data into the voice conversion neural network, and obtaining target voice data based on an output of the voice conversion neural network.

10. The server of claim 9, wherein:

each of the training voice data group comprises a first quantity of training voice data, and any two of the training voice data is parallel corpus with respect to each other, wherein the second quantity is smaller than the first quantity;

the first source speaker voice data group comprises the first quantity of the first source speaker voice data, and the first source speaker voice data group and any of the training voice data is parallel corpus with respect to each other; and the second source speaker voice data group and the personalized voice data group are parallel corpus with respect to each other.

11. The server of claim 10, wherein the instructions for selecting the two of the training voice data groups from the first training data set to input into the voice conversion neural network for training comprise:

instructions for taking one of the two training voice data groups as a source voice data group, and the other of the two training voice data groups as the target voice data group; and instructions for inputting the source voice data group and the target voice data group into the voice conversion neural network for training;

the instructions for inputting one of the training voice data groups selected from the first training data set and the first source speaker voice data group into the voice conversion neural network for training comprise:

instructions for selecting one of the training voice data group from the first training data set as the target voice data group, and taking the source speaker voice data group as the source voice data group; and instructions for inputting the source voice data group and the target voice data group into the voice conversion neural network for training; and the instructions for inputting the second source speaker voice data group and the personalized voice data group are into the voice conversion neural network for training comprise:
- instructions for taking the second source speaker voice data group as the source voice data group, and taking the personalized voice data group as the target voice data group; and
- instructions for inputting the source voice data group and the target voice data group into the voice conversion neural network for training.

12. The server of claim 11, wherein the instructions for inputting the source voice data group and the target voice data group into the voice conversion neural network for training comprise:
- instructions for selecting one source voice data from the source voice data group, and selecting one target voice data corresponding to the source voice data from the target voice data group;
- instructions for obtaining at least one source voice acoustic parameter of the source voice data and at least one target voice acoustic parameter of the target voice data;
- instructions for performing a dynamic time warping on the at least one source voice acoustic parameter based on the at least one target voice acoustic parameter to obtain the aligned at least one source voice acoustic parameter; and
- instructions for inputting the aligned at least one source voice acoustic parameter and the at least one target voice acoustic parameter into the voice conversion neural network for training.

13. The server of claim 11, wherein:
- the at least one source voice acoustic parameter comprises at least one of a frequency spectrum, a fundamental frequency, a non-periodic frequency, and an unvoiced/voiced sound of the source voice data obtained through a voice feature analyzer; and
- the at least one target voice acoustic parameter comprises at least one of a frequency spectrum, a fundamental frequency, a non-periodic frequency, and an unvoiced/voiced sound of the target voice data obtained through the voice feature analyzer.

14. The server of claim 13, wherein the instructions for performing the dynamic time warping on the at least one source voice acoustic parameter based on the at least one target voice acoustic parameter comprises:
- instructions for calculating a Mel-generalized cepstral of the frequency spectrum of the source voice data and a logarithm of the fundamental frequency of the source voice data, and calculating the unvoiced/voiced sound of the source voice data based on the logarithm of the fundamental frequency of the source voice data;
- instructions for calculating a Mel-generalized cepstral of the frequency spectrum of the target voice data and a logarithm of the fundamental frequency of the target voice data, and calculating the unvoiced/voiced sound of the target voice data based on the logarithm of the fundamental frequency of the target voice data; and
- instructions for performing the dynamic time warping on each of the Mel-generalized cepstral of the frequency spectrum of the source voice data, the logarithm of the fundamental frequency of the source voice data, the unvoiced/voiced voice of the source voice data, and the non-periodic frequency of the source voice data based on the Mel-generalized cepstral of the frequency spectrum of the target voice data, the logarithm of the fundamental frequency of the target voice data, the unvoiced/voiced voice of the target voice data, and the non-periodic frequency of the target voice data, respectively.

15. The server of claim 9, wherein the instructions for inputting the to-be-converted voice data into the voice conversion neural network comprise:
- instructions for obtaining at least one to-be-converted voice parameter of the to-be-converted voice data, wherein the at least one to-be-converted voice parameter comprises at least one of a fundamental frequency, a frequency spectrum, and a non-periodic frequency of the to-be-converted voice data; and
- instructions for inputting the at least one to-be-converted voice parameter of the to-be-converted voice data into the voice conversion neural network.

16. The server of claim 15, wherein:
- the output of the voice conversion neural network comprises at least one target acoustic parameter of the target voice data;
- the at least one target acoustic parameter comprises a Mel-generalized cepstral of the target voice data, a logarithm of a fundamental frequency of the target voice data, and a non-periodic frequency of the target voice data;
- the instructions for obtaining the target voice data based on the output of the voice conversion neural network comprise:
- instructions for calculating the frequency spectrum of the target voice data based on the Mel-generalized cepstral of the target voice data, and calculating the fundamental frequency of the target voice data based on the logarithm of the fundamental frequency of the target voice data; and
- instructions for synthesizing the frequency spectrum of the target voice data, the fundamental frequency of the target voice data, and the non-periodic frequency of the target voice data to obtain the target voice data.

17. A non-transitory computer-readable storage medium storing one or more computer programs executable on a processor to implement a voice conversion training method, wherein the one or more computer programs comprise:
- instructions for forming a first training data set, wherein the first training data set comprises a plurality of training voice data groups;
- instructions for selecting two of the training voice data groups from the first training data set to input into a voice conversion neural network for training;
- instructions for forming a second training data set, wherein the second training set comprises the first training data set and a first source speaker voice data group;
- instructions for inputting one of the training voice data groups selected from the first training data set and the first source speaker voice data group into the voice conversion neural network for training;
- instructions for forming a third training data set, wherein the third training data set comprises a second source speaker voice data group and a personalized voice data group, the second source speaker voice data group comprises a second quantity of second source speaker voice data and corresponds to a same speaker with the first source speaker voice data group, and the personalized voice data group comprises the second quantity of personalized voice data; wherein the personalized voice data group is obtained from a terminal device;

Instructions for inputting the second source speaker voice data group and the personalized voice data group into the voice conversion neural network for training;

instructions for obtaining to-be-converted voice data, wherein the to-be-converted voice data corresponds to a same speaker with the personalized voice data group; and instructions for inputting the to-be-converted voice data into the voice conversion neural network, and obtaining target voice data based on an output of the voice conversion neural network.

18. The storage medium of claim 17, wherein:

each of the training voice data group comprises a first quantity of training voice data, and any two of the training voice data is parallel corpus with respect to each other, wherein the second quantity is smaller than the first quantity;

the first source speaker voice data group comprises the first quantity of the first source speaker voice data, and the first source speaker voice data group and any of the training voice data is parallel corpus with respect to each other; and the second source speaker voice data group and the personalized voice data group are parallel corpus with respect to each other.

19. The storage medium of claim 18, wherein the instructions for selecting the two of the training voice data groups from the first training data set to input into the voice conversion neural network for training comprise:

instructions for taking one of the two training voice data groups as a source voice data group, and the other of the two training voice data groups as the target voice data group; and instructions for inputting the source voice data group and the target voice data group into the voice conversion neural network for training;

the instructions for inputting one of the training voice data groups selected from the first training data set and the first source speaker voice data group into the voice conversion neural network for training comprise:

instructions for selecting one of the training voice data group from the first training data set as the target voice data group, and taking the source speaker voice data group as the source voice data group; and instructions for inputting the source voice data group and the target voice data group into the voice conversion neural network for training; and the instructions for inputting the second source speaker voice data group and the personalized voice data group are into the voice conversion neural network for training comprise:

instructions for taking the second source speaker voice data group as the source voice data group, and taking the personalized voice data group as the target voice data group; and instructions for inputting the source voice data group and the target voice data group into the voice conversion neural network for training.

20. The storage medium of claim 19, wherein the instructions for inputting the source voice data group and the target voice data group into the voice conversion neural network for training comprise:

instructions for selecting one source voice data from the source voice data group, and selecting one target voice data corresponding to the source voice data from the target voice data group;

instructions for obtaining at least one source voice acoustic parameter of the source voice data and at least one target voice acoustic parameter of the target voice data;

instructions for performing a dynamic time warping on the at least one source voice acoustic parameter based on the at least one target voice acoustic parameter to obtain the aligned at least one source voice acoustic parameter; and instructions for inputting the aligned at least one source voice acoustic parameter and the at least one target voice acoustic parameter into the voice conversion neural network for training.

* * * * *